United States Patent [19]

Fröroth

[11] Patent Number: 4,753,313
[45] Date of Patent: Jun. 28, 1988

[54] TOWING VEHICLE

[76] Inventor: Ake Fröroth, Strandvägen 43, S-114 56 Stockholm, Sweden

[21] Appl. No.: 873,623

[22] Filed: Jun. 12, 1986

Related U.S. Application Data

[63] Continuation-in-part of Ser. No. 567,861, Dec. 6, 1983, abandoned.

[30] Foreign Application Priority Data

Apr. 7, 1982 [SE] Sweden .................................. 8202216

[51] Int. Cl.⁴ .......................... B62D 61/12; B65G 7/04
[52] U.S. Cl. ....................................... 180/209; 180/12; 180/15; 280/43.23; 414/471
[58] Field of Search ................ 180/209, 169, 15, 14.1, 180/12; 280/43.12, 43.23, 423 R, 423 B, 425 R, 475; 414/469, 471

[56] References Cited

U.S. PATENT DOCUMENTS

| | | | |
|---|---|---|---|
| 3,355,043 | 11/1967 | Talbert | 414/469 |
| 3,563,329 | 2/1971 | Licari | 180/209 |
| 3,790,013 | 2/1974 | Smith | 414/469 |

Primary Examiner—John J. Love
Assistant Examiner—Mitchell J. Hill
Attorney, Agent, or Firm—McGlew and Tuttle

[57] ABSTRACT

A towing vehicle has a front axle carrying at least one wheel, and a rear axle, the wheels of which are steerable and drivably connected to an engine of the vehicle. A coupling mechanism is carried by the vehicle frame and provided to give substantially rigid interconnection of the vehicle frame and an object which is to be towed. A lifting mechanism is provided and is adapted to allow lifting of the front wheels from the ground when the coupling mechanism is in engagement with the object. The lifting mechanism acts between at least a part of the vehicle frame and the front wheels.

7 Claims, 3 Drawing Sheets

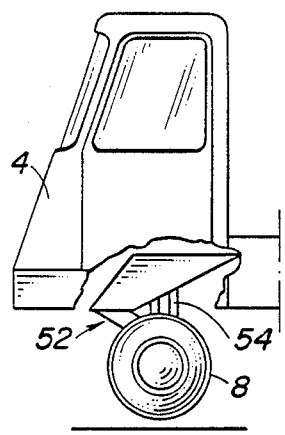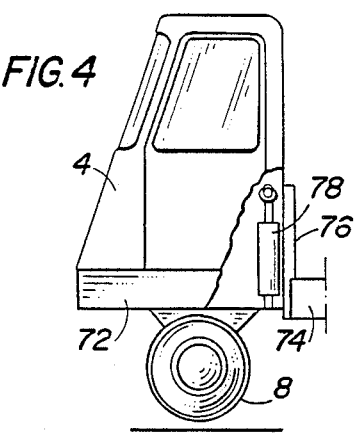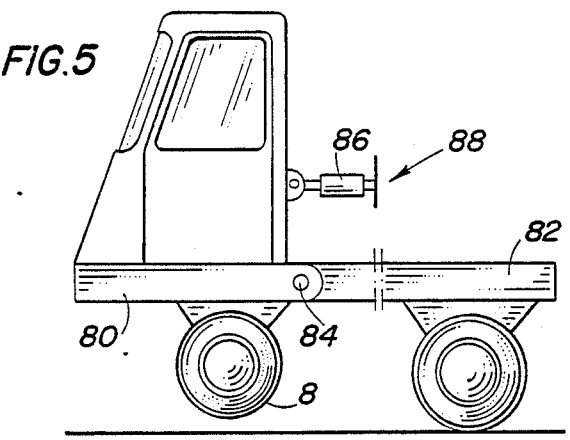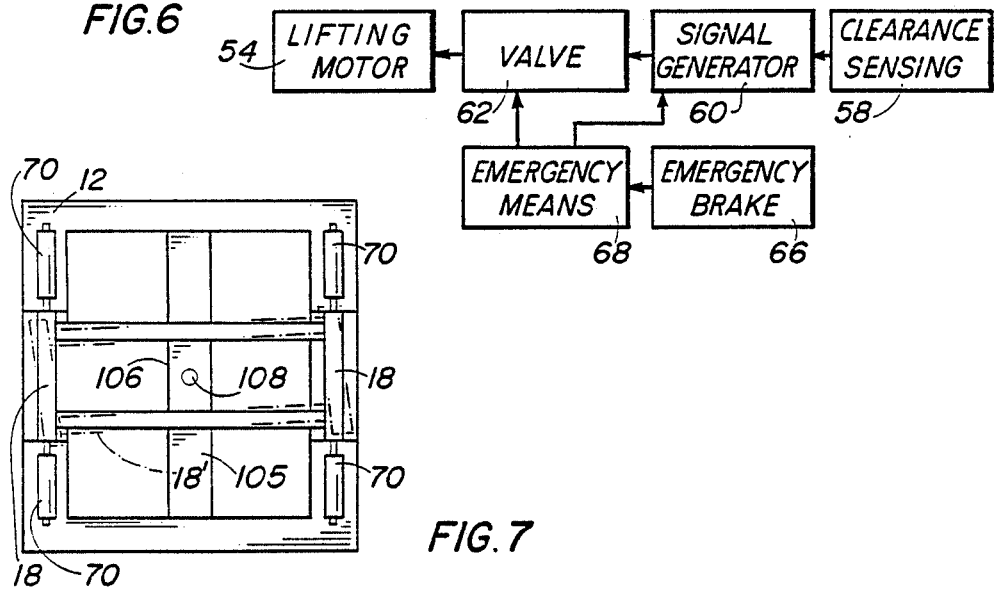

TOWING VEHICLE

CROSS REFERENCE TO RELATED APPLICATION

This is a continuation-in-part application of Ser. No. 567,861, filed Dec. 6, 1983, now abandoned, which itself was based on a PCT application No. WO83-03590 having an international publication date of Oct. 27, 1983.

FIELD AND BACKGROUND OF THE INVENTION

The present invention relates to a towing vehicle with a front axle carrying at least one wheel and a rear axle, the wheels of which are steerable and driveably connected to the vehicle driving means, coupling means carried by the vehicle frame and implemented to provide substantially rigid interconnection of the vehicle frame and an object to be towed, and lifting means adapted to allow lifting of the front wheels from the ground or substructure when the coupling means is in engagement with the object to be towed.

Towing vehicles of this kind are intended, inter alia, for moving containers, or trailers etc. in terminus areas. The principles for the type of container handling intended here are well known and appear from the Swedish Pat. No. 7808448-0, for example. Swedish Pat. No. 7808448-0 and International application publication No. 83-03590, are incorporated here by reference. The occurrence of ramps having different slopes and configurations causes special problems in this container handling environment, however.

One of these problems is the risk that the towing vehicle, when transporting an empty and therefore comparatively light container down a ramp, will tip forward so that the front wheels impact against the substructure during emergency braking. Should this happen, there also occurs a heavy and uncontrollable vertical jerk of the empty container, until the forward edge reaches the ground, which can result in personal injury and material damage.

A problem of the same character also occurs in emergency braking, if the respective driving wheels brake on substructure with different coefficients of friction, or if braking occurs during a turn. One of the wheels may just be passing through an oil slick, for example. The result here will also be a heavy and uncontrollable jerk by the empty container, this time laterally.

SUMMARY OF THE INVENTION

The object of the present invention is to provide a solution to the above-mentioned and similar problems.

The invention is based on the knowledge that the front wheels should be able to be brought very quickly into contact with the substructure when emergency situations of the kind mentioned above occur.

Accordingly, an object of the present invention is to provide a towing vehicle having a frame with a front axle carrying at least one wheel and a rear axle carrying at least two wheels which are steerable, the frame also including drive means which are connectable to the rear wheels for driving the rear wheels, coupling means connected to the frame for being connected to an object to be towed, and lifting means connected to the frame for raising and lowering the front wheel with respect to the frame.

A further object of the invention is to provide a towing machine which includes sensing means for sensing the level of the front wheel above the ground and control means for controlling the lifting means to raise or lower the front wheel.

The invention results in that the constructional implementation of the lifting means will be simple, since in principle it shall only function for lifting the lightly loaded front wheels relative the vehicle frame. At the same time, the lifting means may also be made to be easily operated and its function easily controllable, such that in accordance with a preferred embodiment of the invention, the front wheels can always be kept at a predetermined distance from the substructure and rapidly brought into contact therewith in an emergency situation.

By the front wheels being brought into contact with the substructure, the effects of the emergency situations discussed above, are eliminated or mitigated. In the first case, the tipping case, there is hardly time for the jerk of the empty container to occur. In the second case, the friction of the front wheels against the substructure prevents slewing of the towing vehicle and thereby a transverse jerk of the load.

BRIEF DESCRIPTION OF THE DRAWINGS

In the drawings:

FIGS. 3 through 5 are partial side elevational views of other embodiments of the invention;

FIG. 6 is a block diagram showing a circuit for controlling the lifting mechanism of the invention;

FIG. 7 is a front elevational view taken along line VII—VII of FIG. 1 showing means for taking up mutual pork stresses between the vehicle and a container to be towed;

DESCRIPTION OF THE PREFERRED EMBODIMENT

Figure 1:
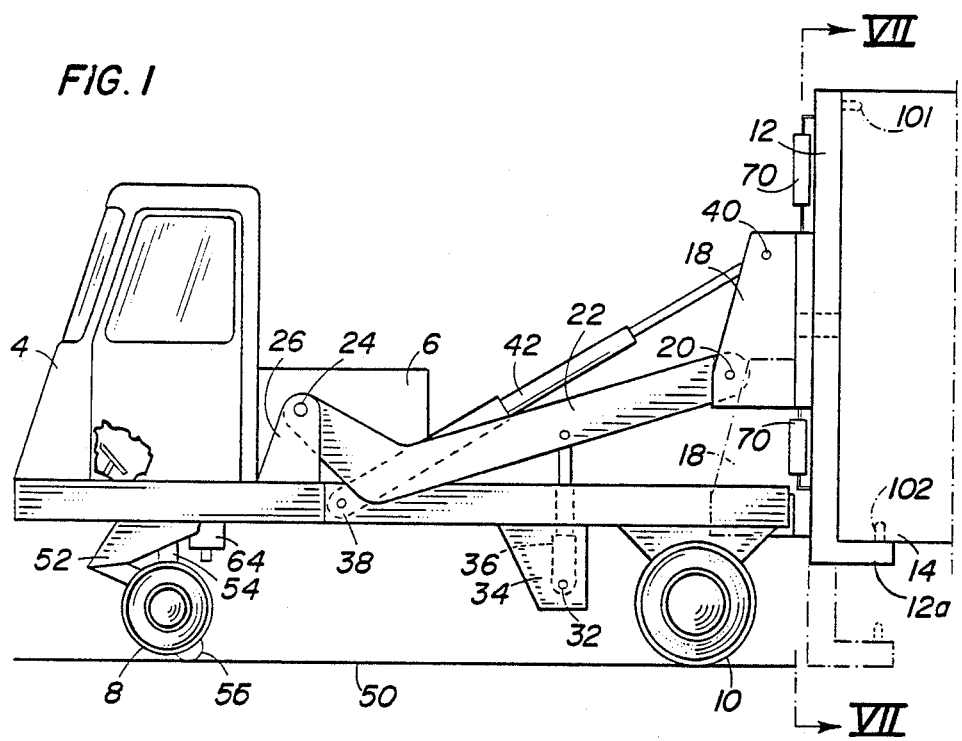
FIG. 1 is a side elevational view which schematically illustrates a towing vehicle in accordance with the invention.
Figure 2:
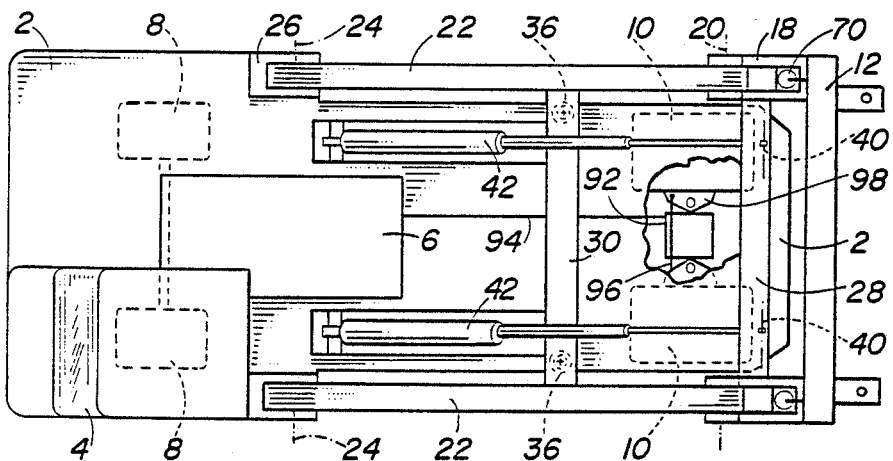
FIG. 2 is a top plan view of the vehicle shown in FIG. 1.

The vehicle in FIGS. 1 and 2 has a rigid frame 2 carrying a driver's cabin 4 and a driving engine unit 6. The vehicle has front wheels 8 and rear wheels 10. In a manner known per se, the rear wheels 10 are steerable and drivably connected to the unit 6. A lifting mechanism or means acts between the front wheels 8 and the frame 2 such as to allow adjustment in height of the front wheels relative the frame, as will be described in detail below.

As shown in FIG. 2, the vehicle of the invention includes a combination differential/steering box 92 which is connected by a drive shaft 94 to the driving engine unit 6. The rear wheels 10 can be steered since each rear wheel is mounted on a steering bracket 98 which has a vertical pin connected to the vehicle frame about which the bracket 98 rotates. Brackets 98 of both rear wheels 10 are connected to each other by a tie rod 96 which can be moved back and forth (up and down in FIG. 2) to pivot wheels 10 by pivoting bracket 98. Known structures which can be used for driving and steering the rear wheels 10 can be found in front wheel drive vehicles which are capable of powering the front wheels for rotation as well as steering the front wheels.

To the rear, the vehicle carries coupling means in the form of a rectangular coupling frame 12 with coupling members for a container, trailer etc. 14, which is to be moved with the aid of the vehicle and which is carried by wheels at its end not visible in FIG. 1. More specifically, the coupling members may be adapted for attaching the frame 12 to the corner fittings of the container etc. in a conventional manner.

The frame 12 is carried by two U-sectioned brackets 18 which in turn, between their legs, are each pivotally carried at 20 by a side beam 22. At their forward ends the side beams 22 are pivotably mounted at 24 in mountings 26 carried by the vehicle frame 2. The brackets 18 are joined together by a cross beam 28 and the side beams 22 by a cross beam 30. Between pivot attachments 32, located low in brackets 34 connected to the frame 2, and pivot attachments at the cross beam 30, two hydraulic lifting cylinders 36 act.

Figure 8:
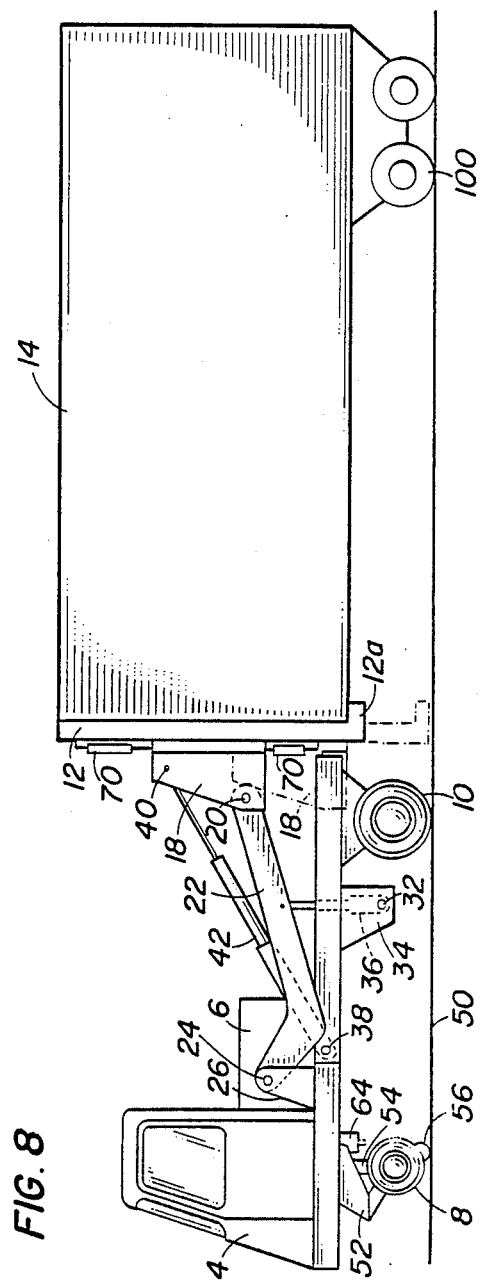
FIG. 8 is a view similar to FIG. 1 but showing a container fixed to the vehicle so that it can be towed by the vehicle.

As shown in FIG. 1, coupling frame 12 has lower rearwardly projecting portions 12a. Each rearwardly projecting portion 12a has an upwardly extending pin 102. As shown in FIG. 8, to couple the container 14 to the coupling frame 12, the coupling frame is first brought to its lower phantom line position. The front end of container 14 near the towing vehicle is then lifted slightly to bring it up on to the portions 12a of the coupling frame 12. This can be done by any known means, for example using a forklift.

Holes are provided in the bottom of container 14 to receive pins 102. The top of frame 12 also has pins 101 which can be received in appropriately provided holes at the front end of container 14. In this way the coupling frame 12 can be effectively fixed to the front end of container 14. This establishes a rigid interconnection between container 14 and at least the rear end of the towing vehicle. This is needed in order to be able to lift the front end of the vehicle, and specifically the front wheels 8, off the ground so that the towing vehicle can tow the container 14. This lifting operation will now be described.

By means of the lifting cylinders 36 the side beams 22 can be lifted from a position essentially level with the frame 12 (phantom lines in FIG. 1) to the solid line position shown in FIG. 1, by rotational movement around the pivots 24.

Two hydraulic rams 42 act between lower pivot attachments 38 in the frame 2 and pivot attachments 40 carried by the cross beam 28. More specifically, the brackets 18 and thereby the frame 12 can be caused to assume different angular positions relative the side beams 22 by means of the hydraulic cylinders 42.

The described arrangement with the members 22, 42, 18 and 36 is preferably implemented and arranged such that there is also space for a so called fifth wheel on the frame and for coupling a semi-trailer when said members are not in use.

For coupling the described towing vehicle to a container etc. resting on the substructure or ground 50 the following measures are taken. The towing vehicle is backed towards the end wall of the container 14 with the bracket 18 and frame 12 in the position illustrated by dashed lines in FIG. 1. Coupling the frame 12 to the container 14 may be performed conventionally. Thereafter, the forward end of the container etc. 14 is lifted up by operating the hydraulic frame cylinders 36 and 42, the container 14 is thus now carried at its forward end by the frame and at its rear end by its wheels (not shown). The front wheels 8 are subsequently lifted with the aid of the lifting means such that they go clear from the substructure 50. The towing vehicle can now be used for transporting the container 14, the rear wheels 10 serving as driving and steering wheels.

By lifting the load in the described manner by means of the coupling means 12, 18 proper, there are avoided the problems connected with lifting a very heavy load a comparatively large distance by raising the vehicle frame relative its rear axle.

In order to faciliate said adjustment in height of the front wheels, and front axle is carried by a toggle joint leg 52 and a hydraulic lifting cylinder 54. By means of the cylinder 54 adjustment in height of the front wheels relative the frame may be carried out.

In the vicinity of the front wheels, the frame carries sensing means for the clearance of the frame relative the substructure 50, in the form of at least one vertically movable slave wheel 56, adapted for running in continuous contact with the substructure. The wheel 56 is easily movable about a vertical joint and otherwise implemented such that the steering function of the back wheels 10 is not affected.

The position of the wheel 56 in relation to the frame 2 is sensed with the aid of an inductive or capacitive transducer of a type which is well known per se, which is mounted on the leg of the wheel 56 close to the frame. The transducer is represented by a block 58 in the block diagram of FIG. 6. The transducer is connected to a signal circuit 60, the output signal of which controls an actuator in the form of a valve system 62 for the adjusting movement of the hydraulic cylinder 54 such that the wheel 8 always assumes a given height relative the wheel 56, i.e. a given distance in relation to the substructure or ground 50.

As an alternative to a slave wheel 56, some form of impulse generator may be used, e.g. one for ultrasonic impulses. This has been indicated with dashed lines at 64 in FIG. 1. The reflected ultrasonic impuses are used conventionally to sense the distance to the substructure 50.

The vehicle also includes an emergency brake, on the drawings only illustrated in the form of a block 66 in FIG. 6, and, associated therewith, emergency means 68. The emergency means 68 consists of an electrical circuit, adapted for being controlled by a signal obtained on the application of the emergency brake, and thereby actuating the circuit 60 and valve system 62 so that the front wheels 8 are brough rapidly into contact with the substructure 50. The function of the signal generator 60 of keeping the wheels 8 at a given distance from the substructure is thus inhibited in emergency situations.

In practice, the distance between the wheels 8 and the substructure 50 is preferably selected as small as possible to allow rapid placing of the wheels against the substructure when necessary.

The frame 12 and bracket 18 are attached to each other while permitting a mutual rotational movement in the plane of the frame 12. This mutual rotational movement is counteracted by four damping cylinders 70. This arrangement permits mutual relative rotation in the case of large loads, when the wheel pair of the vehicle is vertically rotated in relation to the rear wheels of the container. Alternatively, this rotational movement can be taken up between the vehicle frame and the rear axle.

In FIGS. 3-5 some alternative lifting means are illustrated for positioning the front wheels relative the frame. In FIG. 3, the front wheels have greater diameter than those of the vehicle in FIG. 1, the toggle joint 52 and cylinder 54 being, however, at least partially accommodated in the vehicle frame, so that the wheel 8 in its retracted position may also be similarly accommodated in the frame.

In FIG. 4 the frame is divided into a forward part 72 carrying the cabin and the front wheels 8 fixedly mounted and a rear part 74 carrying the remaining mechanisms of the towing vehicle as illustrated in FIG. 1. The parts 72 and 74 are movably connected to each other in the vertical direction via guide means 76. At 78 power means are indicated in the form of a cylinder for vertical displacement of the frame part 72 in the guide arrangement 76.

In FIG. 5 an arrangement is schematically illustrated, where the frame is similarly divided into a part 80 carrying the cabin and front wheels 8 fixedly mounted and a main frame 82 carrying the remaining mechanisms of the towing vehicle. The two frame parts 80 and 82 are pivotably connected to each other at 84 about a horizontal transverse axle. Power means, indicated in the form of a cylinder 86, act between the forward frame part 80 and a fixed part of the rear frame part 82, this part being schematically indicated at 88.

Solutions for lifting the wheels other than those described above are also conceivable. As an example the type of retraction used for aircraft may be mentioned.

The front wheels of the vehicle described above and illustrated on the drawings are, as mentioned, always kept sufficiently free from the substructure 50 to allow the steering and driving functions of the rear wheels 10. This means that if the vehicle and the container are to travel up a ramp after having travelled on a substantially horizontal substructure, the front wheels, as controlled by the described sensing and control means 58-64, may need to be raised still more so that they will be clear of the ramp from the beginning. By the vertical mobility of the front wheels and with the aid of the hydraulic cylinders 36 and 42, a far-reaching adaption to different slopes and configurations of ramps can be attained without the risk of the goods container 14 or the front wheels 8 being brought into contact with any part of the ramp. For example, if the vehicle and the container are to pass a hump on a ramp it may be necessary, for avoiding contact between the container and the hump, to raise the front end of the container primarily with the aid of the cylinders 36, with simultaneous adjustment by means of the cylinders 42 and the spacing of the front wheels with respect to the substructure.

If the vehicle is to be moved without load, i.e. with the front wheels on the substructure, the sensing function for the front wheels is preferably diconnected.

It will be noted that the described arrangements for positioning the front wheels also at least partially solves the problems discussed in the introduction, in conjunction with emergency braking with an empty container on a downwardly sloping ramp and/or emergency braking where the friction at the rear wheels is different for each wheel.

The invention does not, of course, exclude the possibility of using a single front wheel.

As shown in FIG. 7, the coupling frame 12 can pivot about an axis extending in the travel direction, with respect to the bracket 18. Bracket 18 is shown in a phantom line tilted position 18'. This is to accommodate for any relative rotation (about an axis in a travel direction) between the towing vehicle and the container. This tilting is resisted by piston and cylinder combinations 70 which are connected between four corners of the bracket 18 and four corners of the coupling frame 12. Cylinder and piston combinations 70 may simply be in the form of hydraulic shock absorbers which are readily available.

To maintain a general centering between bracket 18 and the coupling frame 12, frame 12 may have a central vertical member 105 which is fixed to frame 12 and which is rotably connected by a pin 108 to a central member 106 fixed to bracket 18. The position of this centering pin 108 is also shown in FIG. 1.

As noted above, lifting means may take various forms according to the invention. In FIG. 3 the front wheel or wheels 8, can be mounted so that they are lifted into a recess of the vehicle frame by a cylinder 54. In the embodiment of FIG. 4, the vehicle frame comprises a front portion 72 which is mounted for vertical sliding with respect to a rear portion 74. The cabin 4 is mounted on the front portion 72. A piston 78 is mounted between the front and rear portions 72, 73 for lifting and lowering the front portion with respect to the rear portion.

In FIG. 5 the front portion 80 of the vehicle frame is pivotably mounted at 84 to the rear portion 82 and can be lifted and lowered with a cylinder 86.

It is noted that in all of these cases, the coupling frame 12 must be connected to a container 14 (as in FIGS. 1 and 8) so that the container holds the rear portion of the frame fixed so that the front portion of the frame (or the wheels alone as shown in FIG. 3) can be lifted with respect to the rear portion of the frame.

Also as noted above, the vehicle frame is provided with sensor means in the form of a sensor 64 near the front of the vehicle frame. These sensor means are provided for sensing how far above the ground 50 the front portion of the vehicle frame is. Sensor 64 can be in the form of a known ultrasonic distance sensor which includes a pulse generator that generates ultrasonic pulses that strike a firm object (such as the ground 50) and with a receiver for receiving the echoed pulse back. A timing circuit is included in such a sensor for timing how long it takes the ultrasonic pulse to make the round trip from the sensor, off the hard surface, and then back to the sensor. The amount of time is a direct reading of the distance between a sensor and the hard surface. Such sensors are commercially available. Any other type of distance sensor can also be used. It is noted that the same type of sensor can be used in the embodiments of FIGS. 3 through 5 for the same purpose, that is to sense how far above the ground the front portion of the vehicle frame is.

It is recalled that the embodiment of FIG. 1 provides lifting means which tilt the entire rigid vehicle frame up with respect to the rear wheels 10. It is also recalled that the slave wheel 56 shown in FIG. 1 can be used in conjunction with a hydraulic cylinder 54 as an alternate way of determining how far above the ground the front portion of the vehicle frame is.

Regardless of the form of the sensor, as shown in FIG. 6 the clearance sensor, they are identified as 58, generates a signal which is supplied to the signal generator 60 which in turn controls valve 62 to supply hydraulic fluid to the lifting cylinder or motor 54. The sensor is set so that it controls valve 62 through the signal generator 60 to maintain a fixed selected clearance between the ground or substrate and the front portion of the vehicle frame. This also utilizes known circuitry which is readily available. Where slave wheel 56 is used, a linear transducer which is connected to the cylinder 54 can be used as the sensor for sensing how far above the ground the front of the vehicle frame is, this signal being used to control signal generator 60 and thus the valve 62.

A brake pedal schematically shown at 112 in FIG. 1, can be connected to an emergency brake system shown at 66 in FIG. 6 which, when the brake 112 is manually operated during an emergency condition, sends a signal to emergency means 68 which override the signal generator 60 and control valve 62 to lower the lifting mechanism 54 as quickly as possible. This is to prevent the vehicle from tilting forward when the emergency brake is activated.

While a specific embodiment of the invention has been shown and described in detail to illustrate the application of the principles of the invention, it will be understood that the invention may be embodied otherwise without departing from such principles.

What is claimed is:

1. A towing vehicle comprising:
   a vehicle frame;
   at least one front wheel mounted for rotation to said vehicle frame;
   at least two rear wheels mounted for rotation and for steering motion to said vehicle frame;
   vehicle drive means connected to said vehicle frame and engaged with said rear wheels for rotating said rear wheels to drive said vehicle frame in a driving direction;
   a coupling frame carried by said vehicle frame, for connecting the vehicle frame to an object to be towed;
   mounting means connected to said vehicle frame and to said coupling frame to hold said coupling frame fixed with respect to said vehicle frame so that engagement can be established between said vehicle frame, said coupling frame and an object to be towed, said mounting means comprising a bracket connected to said coupling frame for tilting about an axis parallel to said driving direction and damping cylinder means connected between said coupling frame and said bracket for dampening tilting of said bracket with respect to said coupling frame; and
   lifting means connected to said vehicle frame and connected to said at least one front wheel for lifting said at least one front wheel with respect to at least part of said vehicle frame so that, with said coupling frame fixed by said mounting means and engaged with an object to be towed, said at least one front wheel can be lifted from a surface on which said towing vehicle rides, and sensing means connected to said vehicle frame adjacent said front wheel for sensing an elevation of said front wheel above the surface on which said vehicle rides.

2. A towing vehicle according to claim 1, wherein said sensing means is connected to said lifting means for controlling said lifting means in response to a sensed elevation of said front wheel above the surface to maintain the elevation constant.

3. A towing vehicle according to claim 2, wherein said sensing means comprises at least one vertically movable slave wheel mounted to said frame for running in contact with the surface, a transducer connected to said slave wheel for generating a signal corresponding to a vertical position of said slave wheel, and actuating means connected to said transducer and to said lifting means for activating said lifting means to one of raise and lower of said at least one front wheel.

4. A towing vehicle according to claim 2, wherein said sensing means comprises a pulse generator connected to said vehicle frame for generating ultrasonic pulses toward the surface and a signal circuit connected to said pulse generator and connected to said lifting means for controlling said lifting means in response to an elevation of said at least one front wheel above the surface.

5. A towing vehicle according to claim 2, including control means connected between said lifting means and said sensing means for controlling said lifting means in response to the elevation sense by said sensing means, said towing vehicle including emergency brake means for braking movement of said towing vehicle, said emergency brake means connected to said control means for effecting lowering of said at least one front wheel by said lifting means in response to emergency braking.

6. A towing vehicle according to claim 5, wherein said control means including a signal generator connected to said sensing means for generating a signal corresponding to an elevation of said at least one front wheel above the surface, a lifting means actuator connected to said signal generator and to said lifting means for activating and lifting means to maintain a constant elevation, said emergency brake means connected to said actuator and said signal generator to inhibit said signal generator and operate said actuator to rapidly lower said at least one front wheel.

7. A towing vehicle comprising:
   a vehicle frame;
   at least one front wheel mounted for rotation to said vehicle frame;
   at least two rear wheels mounted for rotation and for steering motion to said vehicle frame;
   vehicle drive means connected to said vehicle frame and engaged with said rear wheels for rotating said rear wheels to drive said vehicle frame in a driving direction;
   a coupling frame carried by said vehicle frame, for connecting the vehicle frame to an object to be towed;
   mounting means connected to said vehicle frame and to said coupling frame to hold said coupling frame fixed with respect to said vehicle frame so that engagement can be established between said vehicle frame, said coupling frame and an object to be towed, said mounting means comprising a bracket connected to said coupling frame for tilting about an axis parallel to said driving direction and damping cylinder means connected between said coupling frame and said bracket for dampening tilting of said bracket with respect to said coupling frame; and
   lifting means connected to said vehicle frame and connected to said at least one front wheel for lifting said at least one front wheel with respect to at least part of said vehicle frame so that, with said coupling frame fixed by said mounting means and engaged with an object to be towed, said at least one front wheel can be lifted from a surface on which said towing vehicle rides, a clearance sensor connected to said vehicle frame adjacent said at least one front wheel for measuring an elevation of said at least one front wheel above the surface over which said vehicle rides, a signal generator connected to said clearance sensor for generating a signal corresponding to said elevation, an actuator connected to said lifting means for actuating said lifting means in response to said signal to maintain a constant level for said at least one front wheel.

* * * * *